(12) United States Patent
Lloyd

(10) Patent No.: US 7,557,995 B1
(45) Date of Patent: Jul. 7, 2009

(54) DEPLOYABLE TELESCOPE SHADE

(75) Inventor: Carl A. Lloyd, Bloomfield, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 381 days.

(21) Appl. No.: 11/484,468

(22) Filed: Jul. 11, 2006

(51) Int. Cl.
*G02B 5/00* (2006.01)
*G02B 27/00* (2006.01)

(52) U.S. Cl. ................. 359/642; 359/601; 359/612

(58) Field of Classification Search ........... 359/601, 359/611–613, 642
See application file for complete search history.

(56) References Cited

U.S. PATENT DOCUMENTS

| | | | |
|---|---|---|---|
| 3,064,534 A | 11/1962 | Tumavicus | |
| 3,176,303 A | 3/1965 | Holland | |
| 3,541,569 A | 11/1970 | Berks et al. | |
| 3,699,576 A | 10/1972 | Hoyer | |
| 3,715,760 A | 2/1973 | Palmer | |
| 4,295,143 A | 10/1981 | Winegard et al. | |
| 4,315,265 A | 2/1982 | Palmer et al. | |
| 4,422,446 A | 12/1983 | Strickland | |
| 4,511,901 A | 4/1985 | Westphal | |
| 4,780,726 A | 10/1988 | Archer et al. | |
| 4,862,190 A | 8/1989 | Palmer et al. | |
| 4,899,167 A | 2/1990 | Westphal | |
| 4,947,825 A | 8/1990 | Moriarty | |
| 5,198,832 A | 3/1993 | Higgins et al. | |
| 5,623,367 A * | 4/1997 | Immel | 359/600 |
| 5,898,529 A | 4/1999 | Meyer et al. | |
| 6,930,654 B2 | 8/2005 | Schmid et al. | |
| 2005/0174727 A1 | 8/2005 | Thomas et al. | |
| 2005/0247415 A1 * | 11/2005 | Conforti | 160/370.21 |

* cited by examiner

*Primary Examiner*—Scott J Sugarman
(74) *Attorney, Agent, or Firm*—RatnerPrestia

(57) ABSTRACT

According to one aspect of this invention, a deployable shade assembly is provided. The deployable shade assembly comprises a plurality of pivotable panels arranged circumferentially about a common central axis. Each pivotable panel is configured to pivot about a hinge axis oriented in a plane substantially perpendicular to the common central axis. The deployable shade assembly further comprises a plurality of interleaved panels, whereby each interleaved panel is hingedly coupled between adjacent pivotable panels. The pivotable and interleaved panels form a closed structure in a collapsed state of the shade assembly, and the pivotable and interleaved panels form an opening in a deployed state of the shade assembly.

8 Claims, 11 Drawing Sheets

US 7,557,995 B1

DEPLOYABLE TELESCOPE SHADE

FIELD OF THE INVENTION

The present invention relates to a deployable shade apparatus for a space-based telescope or other application.

BACKGROUND OF THE INVENTION

Current space telescopes, such as the Hubble Space Telescope Imaging Satellite shown in FIG. 3, include a primary mirror (also referred to as an aperture) and a secondary mirror encapsulated within cylindrical barrel assembly 205. An exposed end 208 of the tubular outer barrel assembly permits the entrance of light that is reflected and focused by the mirrors. The open end of the outer barrel assembly may be commonly referred to as an opening 208. The outer barrel assembly 205 shields the mirrors from the heat of the sun, protects the mirrors from space debris, and limits the exposure of the mirrors to stray light, i.e. light not emanating from the point of observation. Stray light decreases the signal to noise ratio (SNR) of the telescope thereby degrading the image quality of the telescope.

A cover 210 is pivotably coupled to open end 208 of outer barrel assembly 205. In an open arrangement, cover 210 is separated from the opening, permitting light to enter the outer barrel assembly, so that the telescope can collect images. In a closed arrangement, cover 210 conceals opening 208, thereby restricting the introduction of light and/or space debris into the outer barrel assembly. The cover 210 is closed during the launch of the satellite and periods when the telescope is not actively collecting images in order to conserve thermal energy and conceal the mirrors from direct sun rays.

The conventional covers are heavy, consume space in the launch vehicle, and have a large moment of inertia which can reduce deployment speed. Moreover, the spatial envelope consumed by the pivoting cover extends beyond the radial boundaries of the outer barrel assembly. In a testing environment (prior to launch), a telescope is positioned in a test tower for testing and analysis of the telescope. However, a conventional test tower may not permit deployment of the cover, due to vertical and radial space constraints, consequently preventing any functional optical test of the telescope in the test chamber. In addition to the above, the outer barrel assembly must be sufficiently robust to support the weight and pivoting action of the cover.

There is a need to further develop and refine outer barrel assemblies and covers to solve the physical space and weight constraints of the telescope.

SUMMARY OF THE INVENTION

According to one aspect of this invention, an imaging apparatus is provided. The imaging apparatus comprises a base structure, an optical component for receiving light from an object, and a shade. The shade includes a plurality of pivotable panels each hingedly about a hinge axis and arranged circumferentially about the optical component. The shade has at least a collapsed state and a deployed state. The collapsed state is formed by the pivotable panels pivoted inwardly toward each other to prevent exposure of the optical component to the light. The deployed state is formed by the pivotable panels pivoted outwardly away from each other to expose the optical component to the light.

According to another aspect of this invention, a deployable shade assembly is provided. The deployable shade assembly comprises a plurality of pivotable panels arranged circumferentially about a common central axis. Each pivotable panel is configured to pivot about a hinge axis oriented in a plane substantially perpendicular to the common central axis. The deployable shade assembly further comprises a plurality of interleaved panels, whereby each interleaved panel is hingedly coupled between adjacent pivotable panels. The pivotable and interleaved panels form a closed structure in a collapsed state of the shade assembly, and the pivotable and interleaved panels form an opening in a deployed state of the shade assembly.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The invention will next be illustrated with reference to the Figures. Such Figures are intended to be illustrative rather than limiting and are included herewith to facilitate explanation of the present invention.

Figure 3:
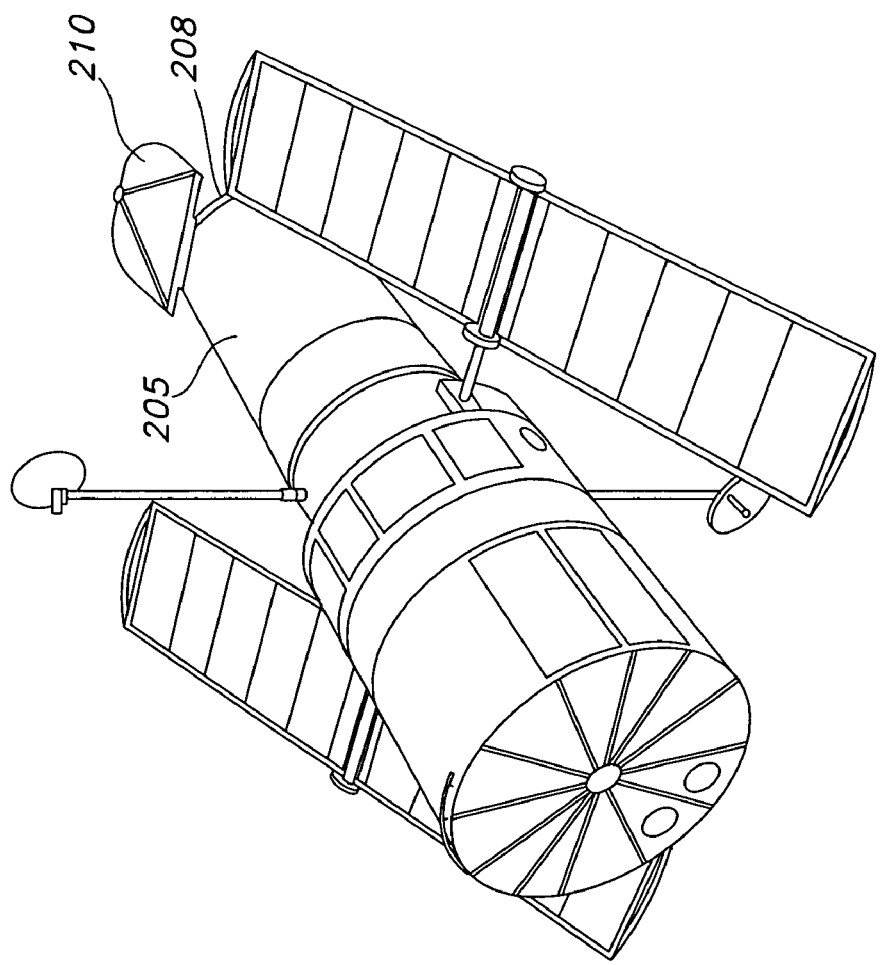
FIG. 3 is a perspective view of a partial cross-section of a conventional satellite telescope.

Referring to FIGS. 1A-1E, an exemplary embodiment of imaging device 5 is illustrated. The imaging device 5 is optionally a space based telescope. The imaging device 5 comprises deployable shade assembly 10 mounted to base 35. The shade assembly 10 is configured to collapse or expand about optical components 11 that are also mounted to base 35. The optical components 11 may be, for example, a lens, mirror, aperture, series of mirrors or any other optical device. It is contemplated that shade assembly 10 replaces cylindrical barrel assembly 205 and cover 210 of the space based telescope shown in prior art FIG. 3.

Figure 1A:
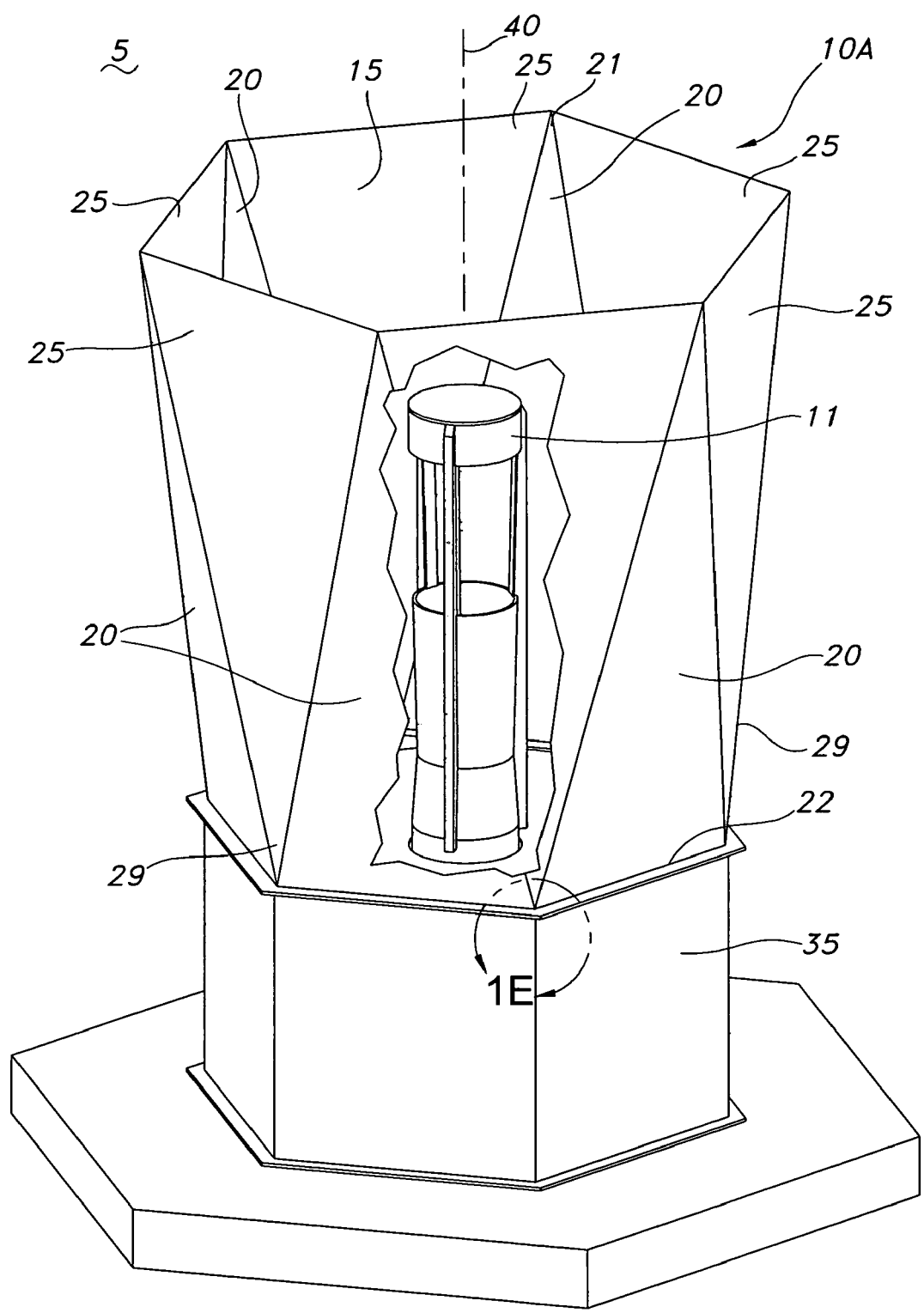
FIG. 1A is a perspective, partial cut-away view of an imaging device, wherein a shade assembly is shown in a deployed state in accordance with an exemplary embodiment of the invention.
Figure 1B:
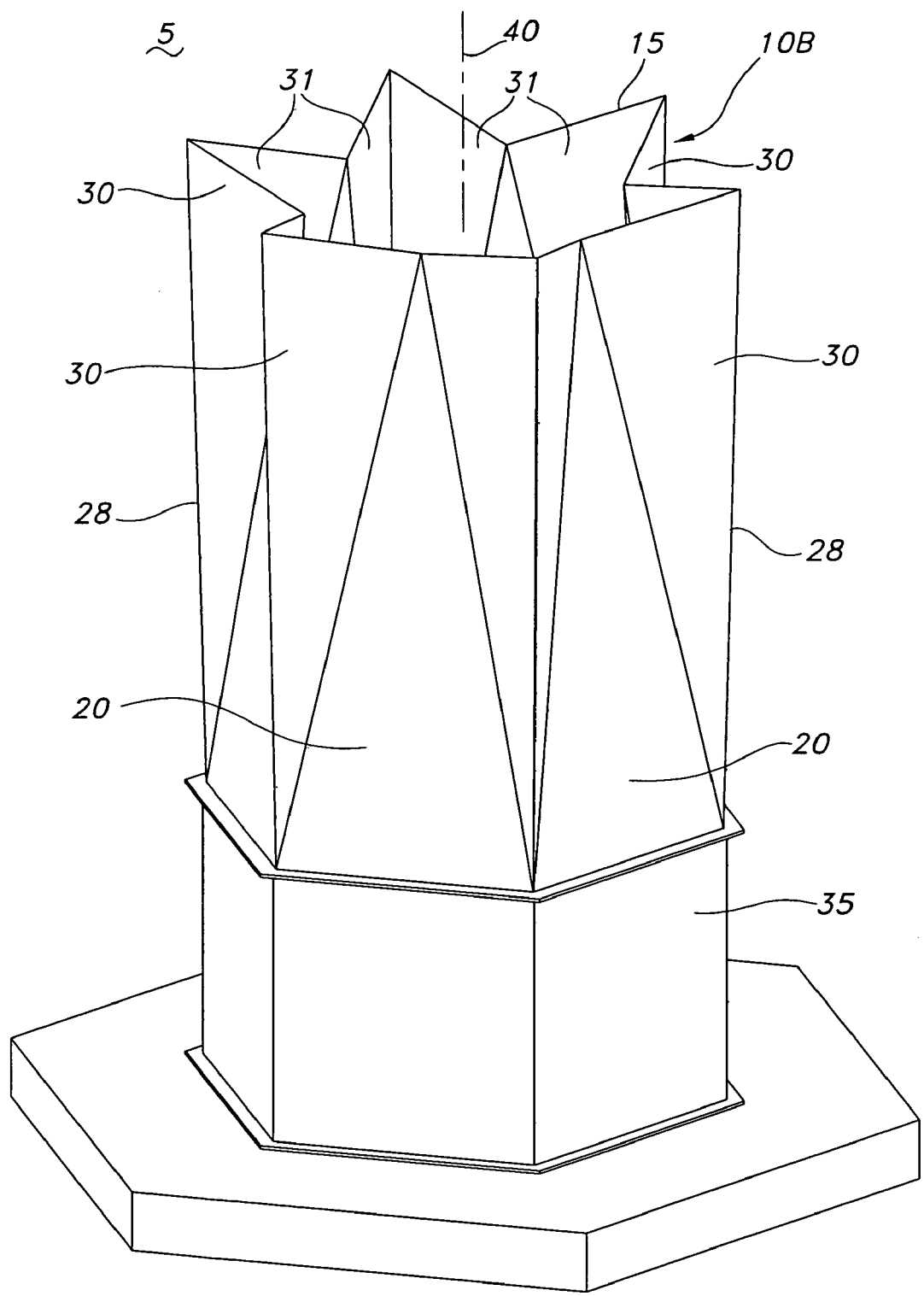
FIG. 1B is a perspective view of the imaging device shown in FIG. 1A, wherein the shade is shown in a partially-deployed state.
Figure 1C:
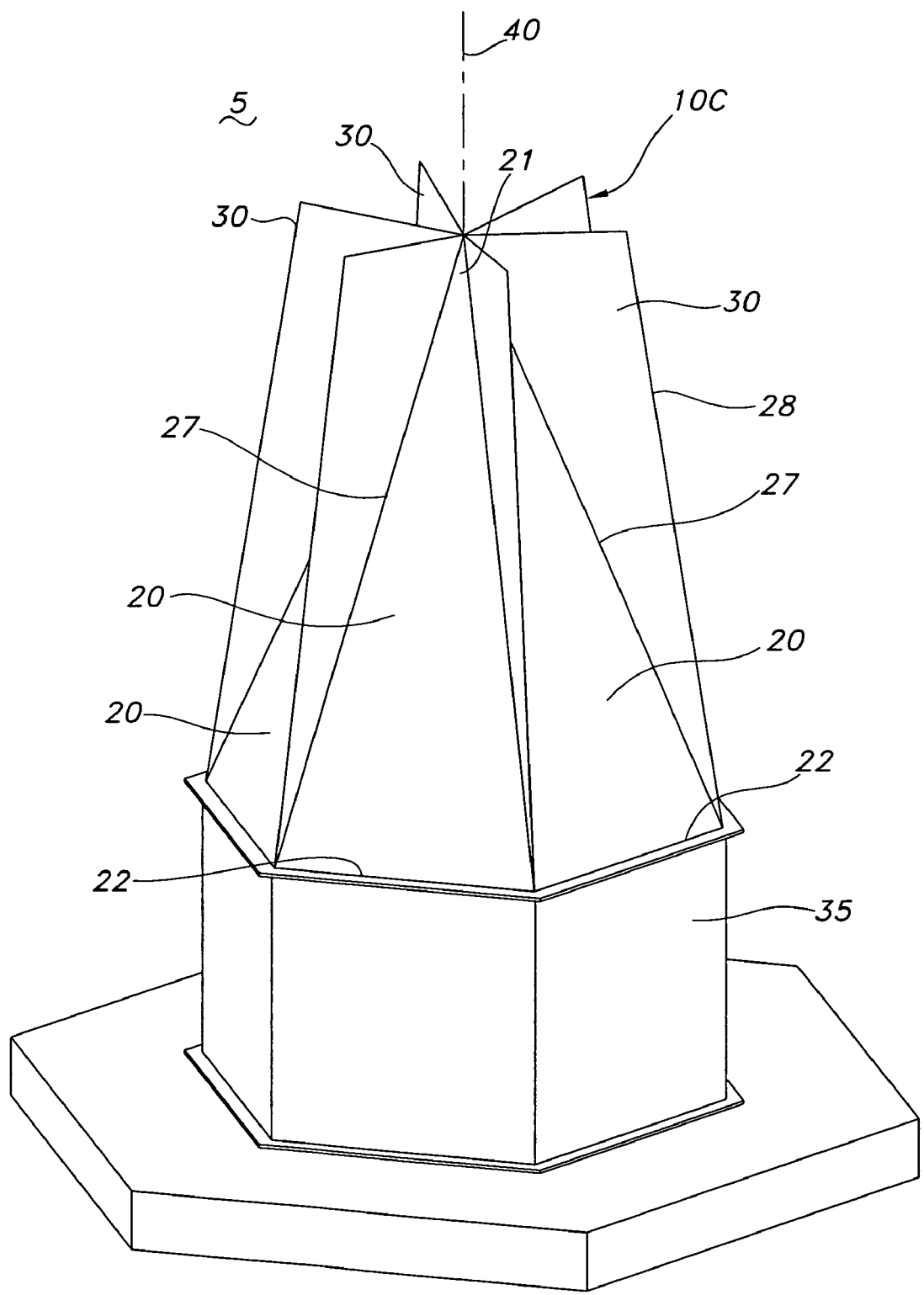
FIG. 1C is a perspective view of the imaging device shown in FIG. 1A, wherein the shade is shown in a collapsed state.

Various states of deployable shade assembly 10 are illustrated in FIGS. 1A-1C. A deployed state of shade assembly 10A is illustrated in. FIG. 1A, a partially-deployed state of shade assembly 10B is illustrated in FIG. 1B, and a collapsed state of shade assembly 10C is illustrated in FIG. 1C. The partially-deployed state of shade assembly 10B defines any state of the shade assembly that is neither completely collapsed nor completely deployed.

In the deployed and partially-deployed states, shade assembly 10A and 10B is positioned to at least partially encapsulate optical components 11, as shown in FIGS. 1A and 1B. The shade assembly defines opening 15 which exposes optical components 11 to the atmosphere and/or light. As described in the background section, light from an imaged object is reflected and focused by optical components 11. The deployed and partially deployed states of shade assembly 10A, 10B prevent stray light exposure. Specifically, the interlocking panels of the deployed shade assembly 10A, 10B define a continuous wall positioned to obstruct stray light and prevent stray light exposure to optical components 11. The continuous wall also obstructs debris from entering the interior confines of the deployed shade assembly during assembly and test operations on the ground when the shade is normally kept closed, although debris could conceivably enter through opening 15 if such debris is present in the surrounding environment.

In the collapsed state, shade assembly 10C completely encapsulates optical components 11, as shown in FIG. 1C. In this configuration, opening 15 is closed or collapsed to substantially limit or prevent exposure of optical components 11 to the atmosphere, light and/or space debris. As described in the background section, the shade assembly may be collapsed during the satellite launch and periods when the imaging device is not actively collecting images to conserve thermal energy and conceal the optics from direct sun rays and space debris.

Referring specifically to the structure and operation of the shade assembly, shade assembly 10 comprises a plurality of interconnected panels forming a closed ring-like structure in the deployed state and a closed turbine-shaped structure in the collapsed state of shade assembly 10.

Figure 1D:
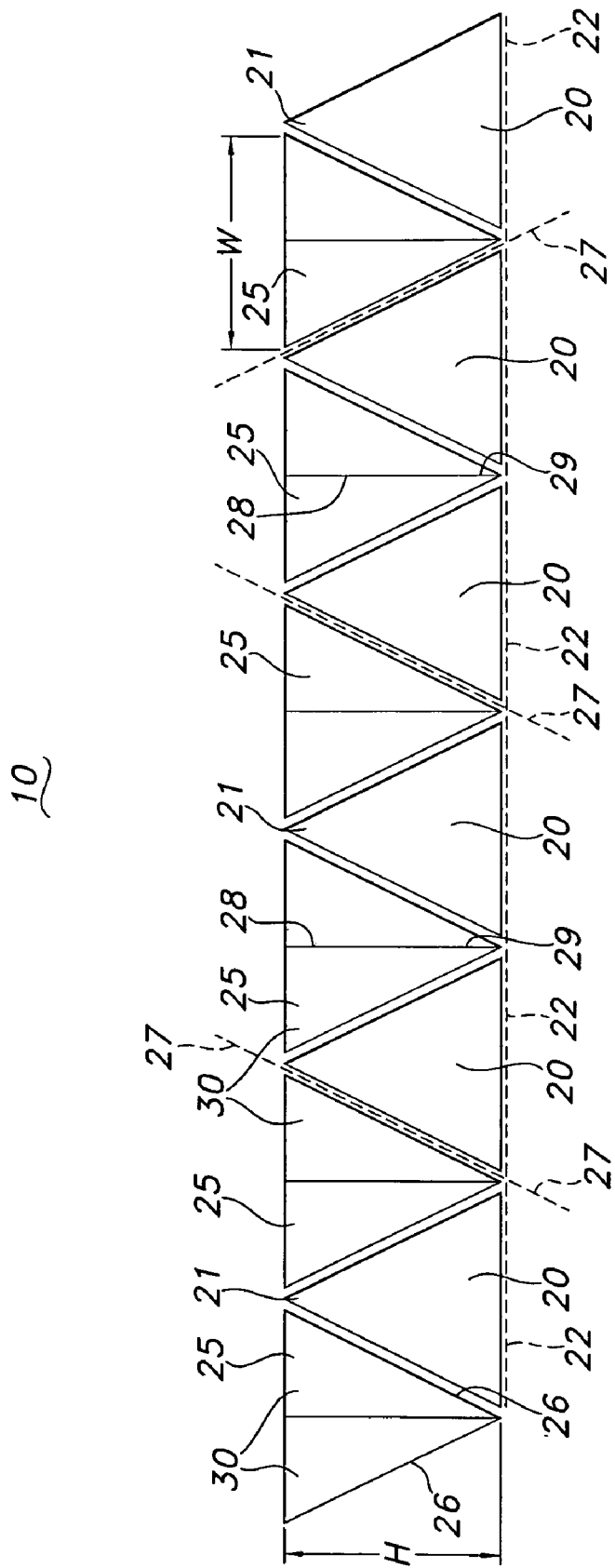
FIG. 1D is a flat-pattern view of the deployable shade assembly shown in FIG. 1A.

More particularly, shade assembly 10 comprises a plurality of pivotable panels 20, and interleaved panels 25 disposed interstitially between adjacent pivotable panels 20. The components of shade assembly 10 are best illustrated in FIG. 1D. The exemplary embodiment illustrated in FIGS. 1A-1E comprises six pivotable panels 20 and six interleaved panels 25, hereinafter referred to as a six-panel shade. The apex 29 of each interleaved panel 25 is positioned between the base sides of adjacent pivotable panels 20. The apex 21 of each pivotable panel 20 is positioned between the base sides of adjacent interleaved panels 25. Each pivotable panel 20 and each interleaved panel 25, respectively, form an isosceles triangle. The interleaved and pivotable panels are preferably the same size and shape. Specifically, the height "H" and width "W" of the panels are substantially equal to limit hyperextension of the shade assembly beyond an erect position. However, it is contemplated that the interleaved panels may be larger or smaller than the pivotable panels to achieve other purposes.

Each interleaved panel 25 includes two hingedly connected sectioned panels 30. The sectioned panels 30 are arranged in an opposing fashion, such that interleaved panel 25 forms an isosceles triangle. The sectioned panels 30 are all approximately the same size and exhibit a right triangular shape.

Each panel of the shade assembly pivots about its hinge axis from the deployed state to the collapsed state, and vice versa. More particularly, pivotable panels 20 are each hingedly coupled to base 35 of imaging device 5 along a hinge axis 22. The equal length sides 26 of each interleaved panels 25 (i.e., the hypotenuse side of each sectioned panel 30) are hingedly coupled to adjacent pivotable panels 20 along hinge axis 27. It will be understood that interleaved panels 25 are not coupled to base 35. The opposing sides of each set of sectioned panels 30 are hingedly coupled along hinge axis 28. A piano hinge, living hinge (i.e., flexible material), bearing system, or any other type of hinging apparatus may be disposed along hinge axes 22, 27 and 28 to facilitate pivoting action of the respective panels.

In operation, pivotable panels 20 are adapted to pivot from a substantially erect position in the deployed state shown in FIG. 1A, to an oblique position in the collapsed state shown in FIG. 1C. In the collapsed state, apexes 21 of pivotable panels 20 converge at central axis 40 in a cone-like shape. In the deployed state, pivotable panels 20 are oriented substantially parallel to central axis 40. In this embodiment, the hinges disposed along hinge axes 27 and 28 limit hyperextension of pivotable panels 20, since the size and shape of the pivotable and interleaved panels are equivalent.

The interleaved panels 25 pivot in synchronism with pivotable panels 20. The hinges disposed along hinge axes 27 and 28 of the interleaved panels 25 are arranged to urge the interleaved panels to fold along their respective hinge axis 28, such that interior surfaces 31 of adjacent sectioned panels 30 fold together. The interleaved panels 25 remain in a substantially erect position, with respect to central axis 40, in both the deployed and collapsed states of shade assembly 10.

Figure 1E:
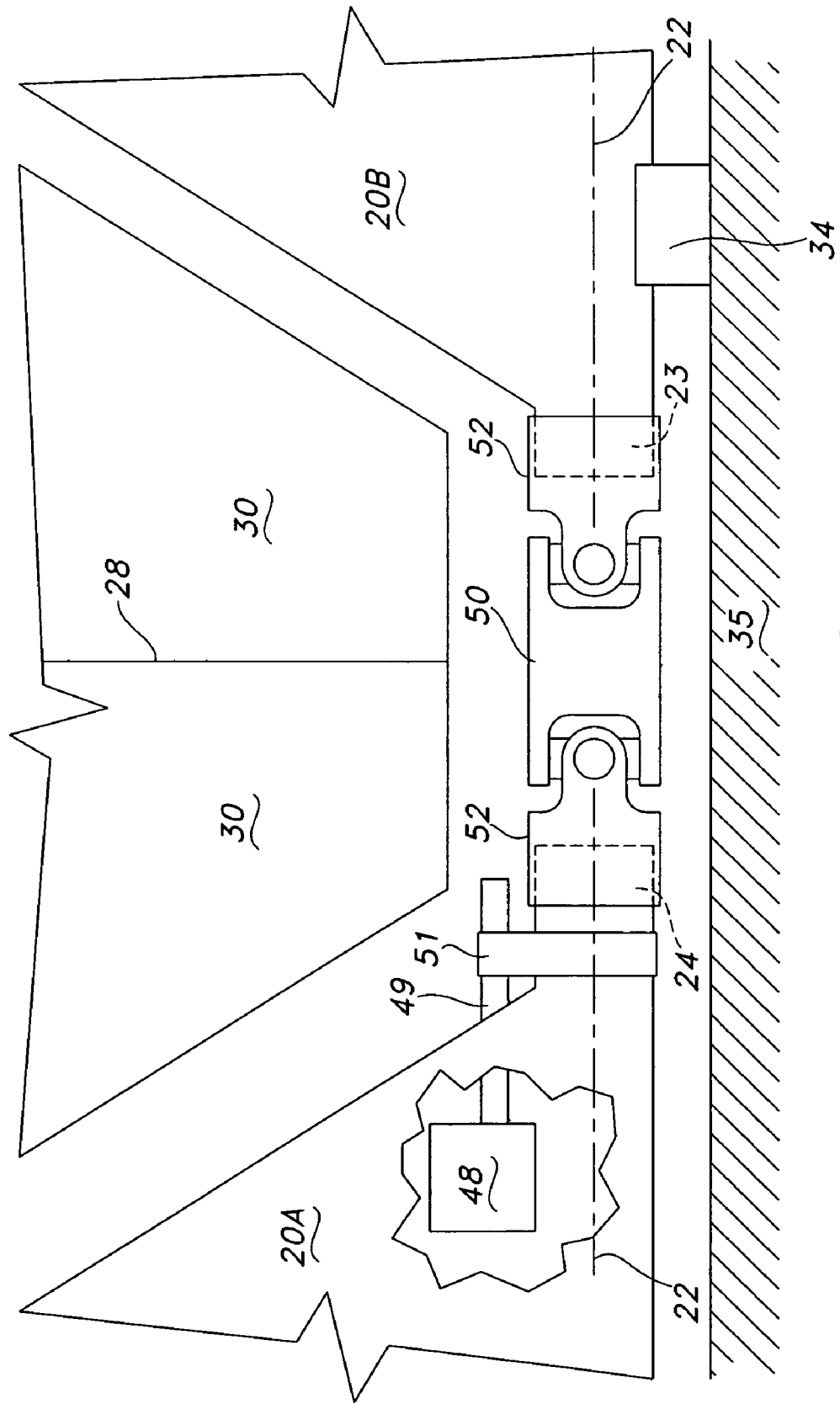
FIG. 1E is a detailed, partial cut-away view of the imaging device shown in FIG. 1A, illustrating an actuating device coupled to a pivotable panel and a universal joint positioned between adjacent pivotable panels.

Referring now to FIG. 1E, motive device 48 is mounted to base 35 or any other fixed structure of the assembly. The device 48 may be a motor, gear drive, preloaded spring, winch system, shape memory alloy, linear actuator or any other actuating device. The device 48 is positioned within the interior confines of shade assembly 10, as shown. The motor, however, may be positioned in any other location. A cut-away view of pivotable panel 20A is illustrated to reveal device 48.

A tension belt or chain 51 is wrapped about output shaft 49 of device 48 and extended shaft 24 of pivotable panel 20A, such that output shaft 49 directly transfers rotational motion to pivotable panel 20A through tension belt 51. The output shaft 49 is configured to rotate in the counterclockwise and clockwise directions to rotate primary pivotable panel 20A toward either the collapsed or deployed state.

Referring still to the exemplary embodiment illustrated in FIG. 1E, in operation, motor 48 pivots panel 20A. The pivoting motion of panel 20A is transferred to the remaining pivotable panels 20, through universal joints 50 mounted between adjacent pivotable panels 20, such that the remaining pivotable panels 20 pivot along with pivotable panel 20A in synchronism towards the deployed and collapsed states of shade assembly 10. Although not shown, the entire assembly includes six universal joints 50 positioned between adjacent pivotable panels 20.

As illustrated in FIG. 1E, universal joint 50 is positioned between pivotable panels 20A and 20B. The universal joint 50 includes two opposing cylindrical collars 52 that are positioned over and fixedly mounted to extended shaft 24 and shaft 23 (hidden from view and shown in dotted lines) of pivotable panels 20A and 20B, respectively. In operation, the rotation of extended shaft 24 about hinge axis 22 induces an equivalent pivotal motion of shaft 23 of pivotable panel 20B. In addition to rotation about hinge axis 22, it is known that universal joints are capable of synchronously transferring rotational motion between misaligned shafts. In this embodiment, hinge axis 22 of each pivotable panel 20 is misaligned with the hinge axes of adjacent pivotable panels 20 by about sixty degrees. The universal joint 50 may accommodate approximately sixty degrees of misalignment between shafts 23 and 24. It will be understood that the misalignment between the pivotable panels increases as the number of pivotable panels decrease. As will be described with respect to the exemplary embodiment illustrated in FIGS. 2A-2D, a shade assembly that includes less than six panels may require other ways to transfer pivotal motion between the panels.

The weight of shade assembly 10 is supported by a series of bearings 34 (one shown in FIG. 1E) fixedly mounted to base 35 and positioned about the circumference of shade assembly 10. The bottom edge of pivotable panel 20 is pivotably coupled to bearing 34, as shown. The bearing 34 facilitates pivotal motion of pivotable panels 20 with respect to base 35. In another embodiment not illustrated herein, the universal joints include a large housing portion that is fixedly mounted to base 35. The housing portion is adapted to support the weight of shade assembly 10, in addition to or in lieu of bearings 34. In yet another embodiment the bottom edge of pivotable panel 20 pivots in a trough (not shown) formed in the base, in lieu of bearings.

Although not illustrated herein, a number of other kinematic systems are contemplated for transferring rotational motion from the motor to panel 20A. For example, it is contemplated that output shaft 49 may be threadedly coupled to a threaded insert in pivotable panel 20, whereby rotation of output shaft 49 rotates panel 20A. The threaded insert may be rotatably coupled to pivotable panel 20 to facilitate pivoting motion of panel 20A. In yet another embodiment gear teeth disposed on extended shaft 24 may interface directly with output shaft 49, transferring the rotational energy of device 48 to shaft 24, thereby eliminating a need for tension belt 51.

In another exemplary application, device 48 is configured to deploy shade assembly 10 from the collapsed state to the deployed state only once. Accordingly, the shade assembly 10 then remains in a deployed state for the life of the system.

Although a single motor is described in connection with the exemplary embodiment, a discrete motor may be coupled to each pivotable panel 20. In such an embodiment, the motors are preferably synchronized to facilitate uniform pivotal motion of the shade assembly. Also, if a discrete motor is coupled to each pivotable panel 20 (embodiment not illustrated), the universal joints interconnecting the pivotable panels may be omitted.

Moreover, according to another exemplary embodiment (not illustrated herein) the shade assembly does not include a motor. In this embodiment, the user manually collapses or deploys shade assembly 10. The shade assembly may include a cabling winch system coupled to one or more primary panels 20A in combination with a preloaded spring coupled to one or more primary panels. In operation, the user pulls the cable to pivot panel 20A toward the collapsed state thereby compressing the spring. When the user releases the cable, the force of the spring urges the primary panels toward the deployed state. In yet another embodiment, a linkage system includes multiple rods each coupled to a respective panel 20, whereby the rods translate in synchronism to simultaneously pivot the pivotable panels.

Although the exemplary embodiment illustrated in FIGS. 1A-1E includes six pivotable panels 20 and six interleaved panels 25, it will be understood that a shade assembly may include any number or arrangement of pivotable and interleaved panels.

Referring next to FIGS. 2A-2E, there is shown another exemplary embodiment of an imaging device 105 generally designated as 105. The imaging device 105 includes base 135, optical components (not shown) and shade assembly 110 mounted to base 135. In this embodiment, shade assembly 110 has four pivotable panels 120 and four interleaved panels 125. The shade assembly is hereinafter referred to as a four-panel shade.

The operation of four-panel shade assembly 110 may be similar to the six-panel embodiment. Briefly, in the deployed state shown in FIGS. 2A and 2B, shade assembly 110A partially encapsulates optical components (not shown) and defines opening 115 which exposes the imaging device to the atmosphere and/or light. In the collapsed state shown in FIGS. 2C and 2D, shade assembly 110C completely encapsulates the optical components and substantially limits or prevents exposure of the imaging device to the atmosphere, light and/or debris.

As shown, the structure of four-panel shade assembly 110 is similar to the six-panel embodiment. The base edges of four pivotable panels 120 are hingedly coupled to base 135, interleaved panels 125 are hingedly coupled to adjacent pivotable panels 125, and each interleaved panel 125 includes two hingedly coupled sectioned panels 130. The hinges may be a piano hinge, a living hinge, or any other known hinge.

Figure 2A:
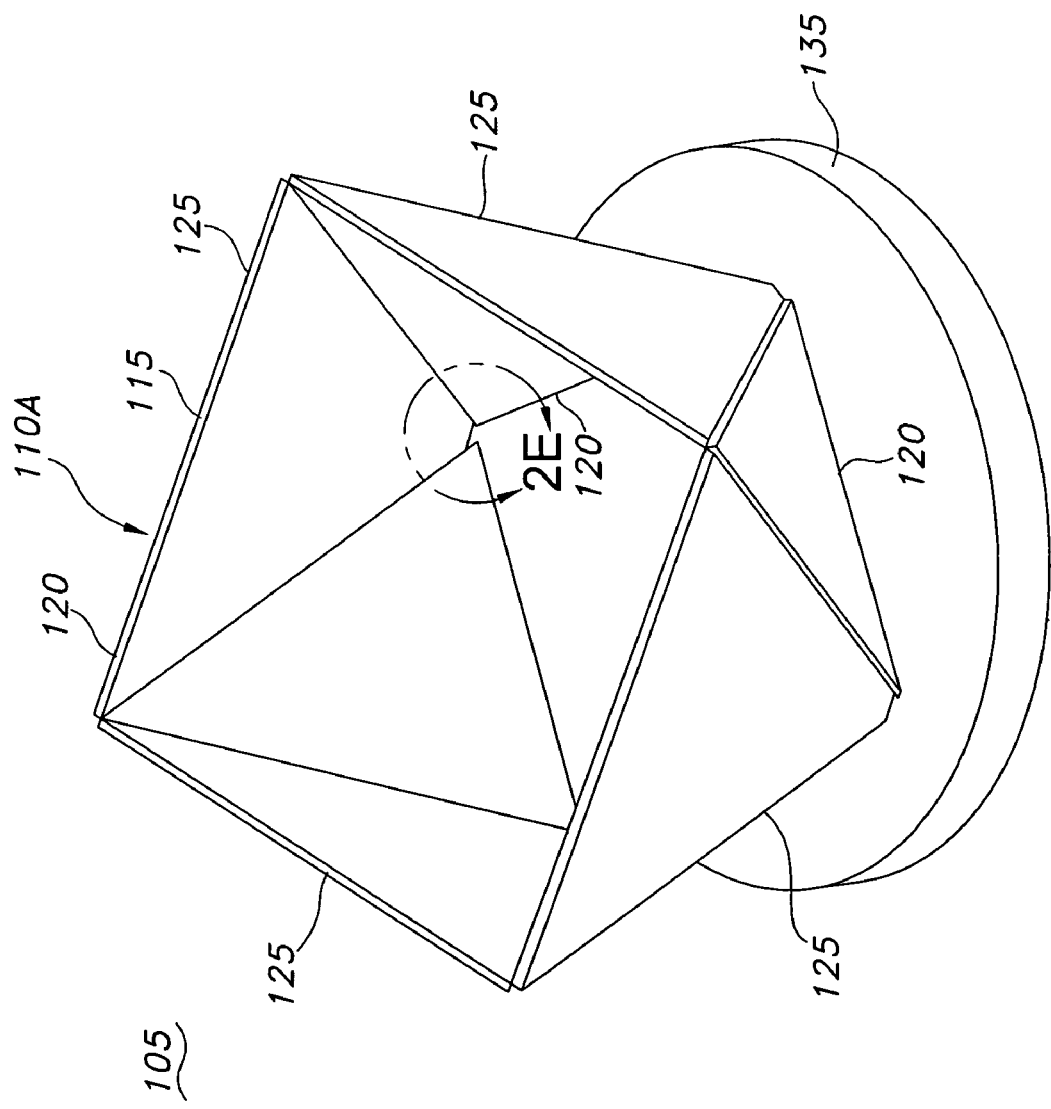
FIG. 2A is perspective view of a deployable shade assembly shown in a deployed state in accordance with another exemplary embodiment of the invention.
Figure 2B:
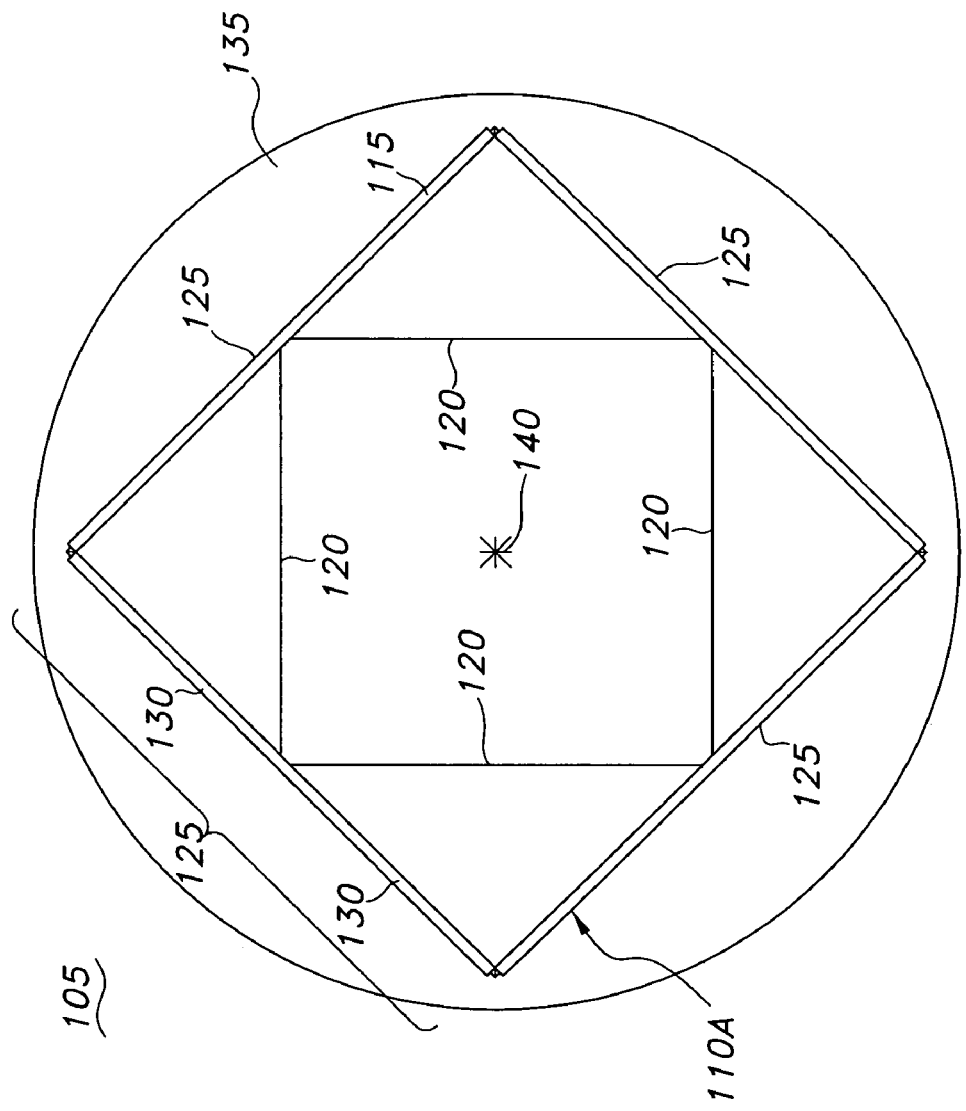
FIG. 2B is a top plan view of the deployable shade assembly shown in FIG. 2A.
Figure 2C:
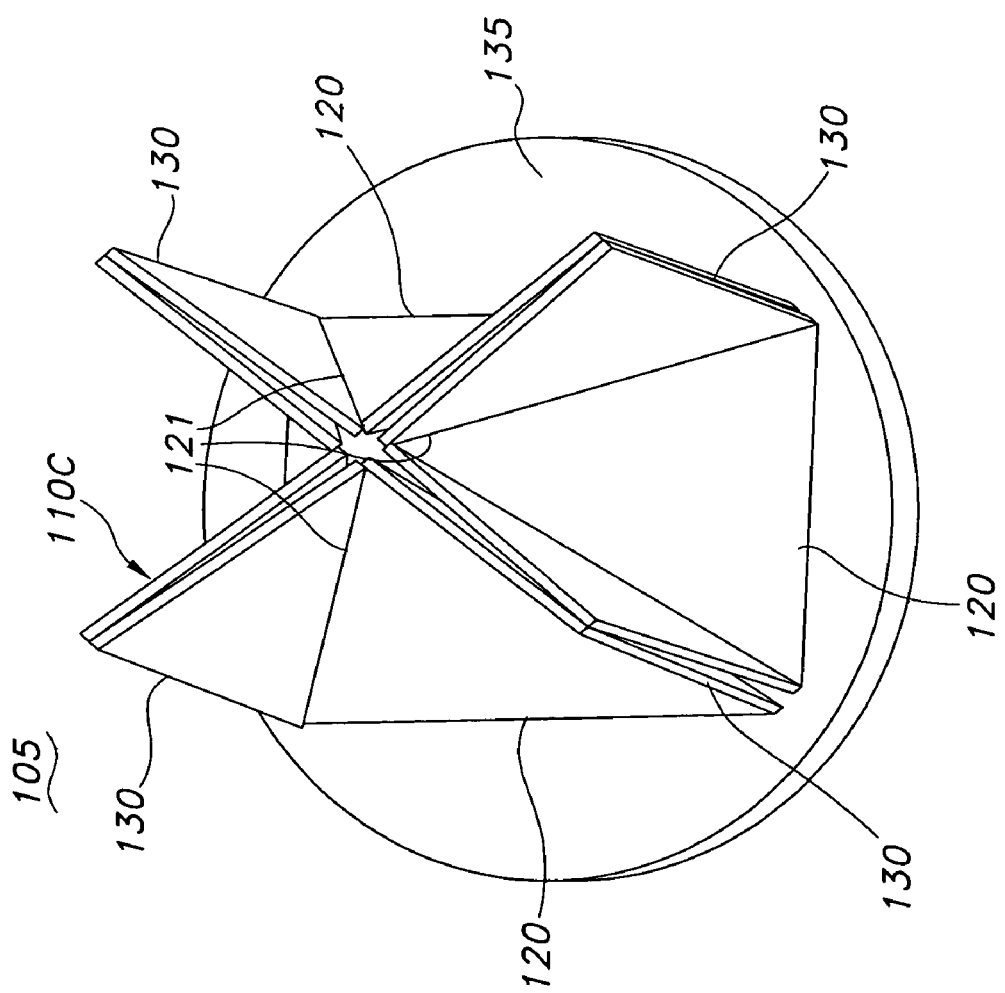
FIG. 2C is a perspective view of the deployable shade assembly shown in FIG. 2A in a collapsed state.
Figure 2D:
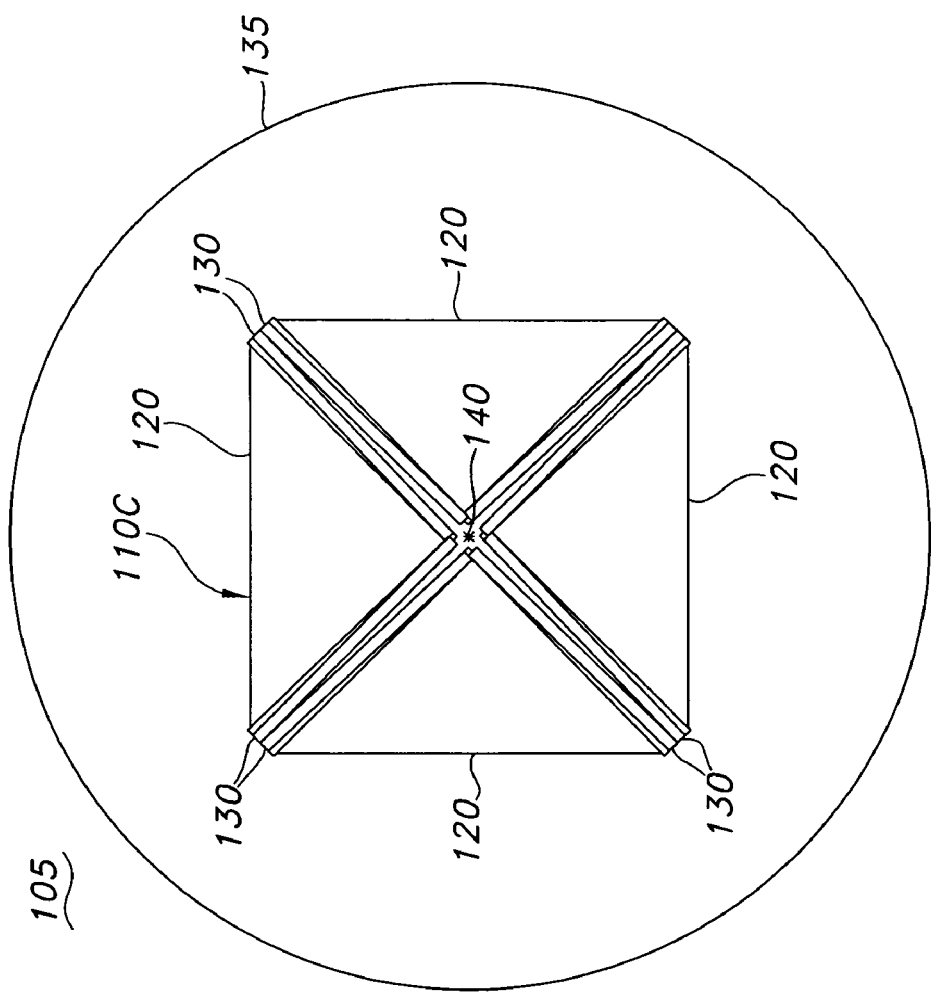
FIG. 2D is a top plan view of the deployable shade assembly shown in FIG. 2C.

The four-panel shade embodiment achieves advantages similar to the six-panel embodiment. In operation, as the four-panel shade advances from the deployed state (shown in FIGS. 2A and 2B) to the collapsed state (shown in FIGS. 2C and 2D), apexes 121 of pivotable panels 120 pivot toward central axis 140 and the adjacent sectioned panels 130 of each interleaved panel 125 fold toward each other. The apexes 121 of the pivotable panels meet at central axis 140 and form a closed structure, thereby encapsulating the optical components, as shown in FIGS. 2C and 2D. As the shade returns from the collapsed state to the deployed state, apexes 121 of the pivotable panels move away from central axis 140, while the adjacent sectioned panels 130 of each interleaved panel pivot away from each other, thereby defining opening 115.

Figure 2E:
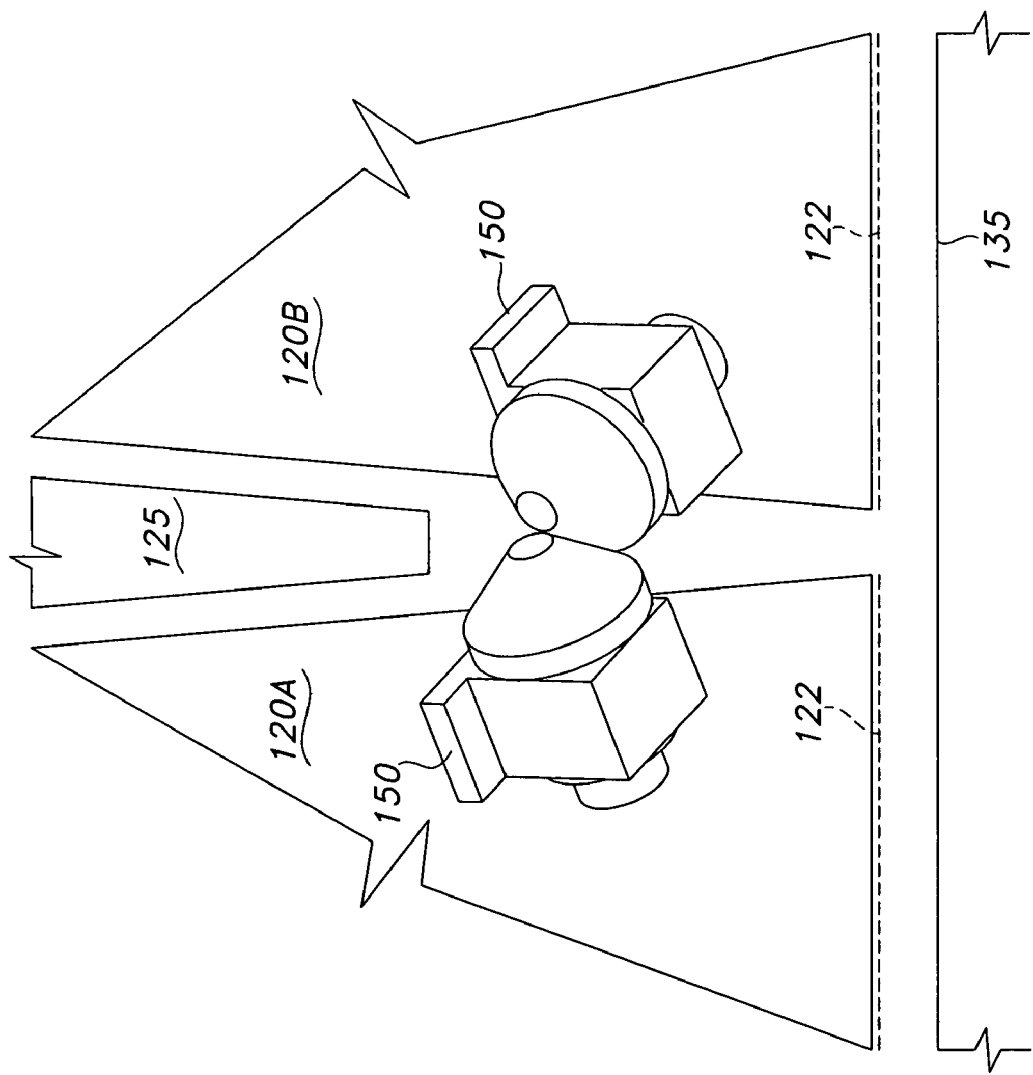
FIG. 2E is a detailed view of the deployable shade assembly shown in FIG. 2A, illustrating a set of bevel gears positioned between adjacent pivotable panels.

Unlike the exemplary embodiment illustrated in FIGS. 1A-1E, the exemplary embodiment illustrated in FIGS. 2A-2E does not include universal joints, since the misalignment between adjacent hinge axes 122 is approximately ninety degrees. Bevel gears 150, such as mitre gears, may accommodate approximately ninety degrees of misalignment between the hinge axes of adjacent pivotable panels 120A and 120B. Accordingly, shade assembly 110 includes a set of bevel gears 150 disposed at each interface between adjacent pivotable panels 120, as shown in FIG. 2E. In total, shade assembly 110 may include four complimentary sets of bevel gears 150.

Referring specifically to FIG. 2E, a single gear is fixedly mounted to pivotable panels 120A and 120B. The gears 150 have the same number of teeth. Hence, the rotational velocities of gears 150 are equal and in synchronism. Accordingly, pivotable panel 120A pivots in synchronism with adjacent pivotable panel 120B, with respect to central axis 140. Furthermore, the other pivotable panels, illustrated in FIGS. 2A and 2B, pivot in synchronism with pivotable panel 120A. This achieves smooth deployment and collapse of shade assembly 110.

Similar to the embodiment illustrated in FIG. 1E, a single motor or other actuating device may be coupled to pivotable panel 120A. The motor (not shown) rotates pivotable panel 120A towards the collapsed and deployed states of shade assembly 110. In another embodiment (not illustrated), one or more of bevel gears 150 is motorized and fixedly mounted to base 135, such that the mechanized bevel gear induces rotation in a complimentary bevel gear.

The shade assembly 10, 110 is particularly advantageous because it consumes significantly less vertical and radial space in the deployed and collapsed states. Specifically, no component of shade assembly 10, 110 extends significantly beyond the radial boundaries of base 35, 135. As described in the background section, a conventional test tower may not permit deployment of the cover, due to vertical and/or radial space constraints, consequently precluding an optical test of a space based telescope. Furthermore, shade assembly 10, 110 is better suited to fit within the confines of an aircraft or space ship storage bay, by virtue of its small size. Finally, shade assembly 10, 110 may be deployed and/or collapsed at a faster rate, by virtue of the folding action of the shade panels.

The two embodiments of the shade assembly illustrated in the Figures are generally adapted for a space based telescope. However, shade assembly 10 is not limited to a space based telescope, as various other applications are envisioned. For example, the shade assembly may be used with a lighting fixture, camera, ground-based telescope, or parabolic antenna. The shade assembly may be used with any system having an aperture and a removable aperture cover for admittance and/or exclusion of light, moisture, air, etc.

In one application, for example, the shade assembly may be mounted to a commercial lighting fixture. With reference now to FIGS. 1A-1C, item 35 may represent the lighting fixture and item 11 represents the light source. The shade assembly 10 may translate from the deployed to the collapsed state, or vice versa, to achieve a desired lighting effect or illumination level, which may be particularly advantageous in a theater setting. In practice, a user may adjust the position of shade assembly 10 to regulate the intensity of the light. Specifically, in the deployed or partially-deployed states, light may emanate from the adjustable opening defined by the shade assembly. The shade assembly blocks or obstructs the light source in the collapsed state, as shown in FIG. 1C.

In another application, the shade assembly may be utilized with an antenna. With reference to FIGS. 1A-1C, item 35 may represent a base structure of the antenna, item 11 may represent the radiating element of the antenna, and shade assembly 10 may represent the parabolic segment of the antenna (i.e. the dish structure). The shade assembly 10 translates from the deployed to the collapsed state, or vice versa, to encapsulate or expose the radiating element to the atmosphere.

In yet another application, the shade assembly may encapsulate a ground based telescope. As background, a conventional ground based telescope is housed in a dome structure having an opening that is obstructed by a moveable door. The telescope is exposed to light in the open position of the door, and protected from light and weather in the closed position of the door. It is envisioned that shade assembly 10, 110 may replace the above-described dome structure and still achieve the requisite thermal control and weather protection.

In still another application, the shade assembly may encapsulate a zoom lens of a camera. As background, conventional cameras with zoom lenses include a removable cap or cover to protect the aperture when the camera is not in use. It is envisioned that shade assembly 10, 110 may replace the removable cap and the support structure of the zoom lens.

While preferred embodiments of the invention have been shown and described herein, it will be understood that such embodiments are provided by way of example only. Numerous variations, changes and substitutions will occur to those skilled in the art without departing from the spirit of the invention. For example, the shade assembly may include any number or arrangement of pivoting, interleaved, and sectioned panels and the panels may be of any general shape or size to achieve the same purpose. Accordingly, it is intended that the appended claims cover all such variations as fall within the spirit and scope of the invention.

What is claimed:

1. An imaging apparatus comprising:
    a base structure,
    a telescope having first and second optical ends for receiving light from an object, and
    a shade including a plurality of pivotable panels each panel having first and second panel ends, the first panel end hingedly coupled to the base structure about a hinge axis and arranged circumferentially about the telescope, and the second panel end extending away from the hinge axis, and
    the first optical end disposed adjacent to the first panel end and the second optical end disposed adjacent to the second panel end,
    the shade having at least
        (a) a collapsed state for preventing exposure of the telescope to the light, the collapsed state formed by the pivotable panels pivoted inwardly toward each other at their second panel end, and
        (b) a deployed state for exposing the telescope to the light, the deployed state formed by the pivotable panels pivoted outwardly away from each other at their second panel end.

2. The imaging apparatus of claim 1 further comprising a plurality of interleaved panels, wherein each interleaved panel is hingedly coupled to adjacent pivotable panels.

3. The imaging apparatus of claim 2 wherein each interleaved panel is divided into first and second sectioned panels, and the first and second sectioned panels are hingedly coupled to each other along a hinge axis and configured to fold towards each other about the hinge axis in the collapsed state.

4. The imaging apparatus of claim 2 wherein each pivotable panel and each interleaved panel define a base portion and an opposing apex forming a triangle.

5. The imaging apparatus of claim 4 wherein the opposing apex of each interleaved panel is positioned between the base portions of adjacent pivotable panels.

6. The imaging apparatus of claim 1 further comprising a motive device configured to pivot one of the pivotable panels about its hinge axis.

7. The imaging apparatus of claim 1 further comprising a universal joint hingedly coupled between adjacent pivotable panels, wherein the universal joint is configured to transfer pivotal motion from one of the pivotable panels to the adjacent pivotable panel, and said one of the pivotable panels and the adjacent pivotable panel each pivots about its respective hinge axis.

8. The imaging apparatus of claim 1 wherein the imaging apparatus is a space based telescope.

* * * * *